US010180836B1

(12) United States Patent
Arguelles et al.

(10) Patent No.: US 10,180,836 B1
(45) Date of Patent: Jan. 15, 2019

(54) GENERATING SOURCE CODE REVIEW COMMENTS USING CODE ANALYSIS TOOLS

(71) Applicant: Amazon Technologies, Inc., Seattle, WA (US)

(72) Inventors: Carlos Alejandro Arguelles, Shoreline, WA (US); Kevin Lester Quadros, Seattle, WA (US); Faizal Sultanali Kassamali, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 206 days.

(21) Appl. No.: 14/834,144

(22) Filed: Aug. 24, 2015

(51) Int. Cl.
*G06F 8/33* (2018.01)
*G06F 8/70* (2018.01)

(52) U.S. Cl.
CPC . *G06F 8/70* (2013.01); *G06F 8/33* (2013.01)

(58) Field of Classification Search
CPC ..... G06F 8/33; G06F 8/70; G06F 8/73; G06F 8/75; G06F 8/77; G06F 11/36; G06F 11/3604; G06F 11/32; G06F 11/3624; G06F 11/366; G06F 11/3664; G06F 11/3668; G06F 11/3672; G06F 11/3696
USPC .......... 717/101, 102–103, 124–126
See application file for complete search history.

(56) References Cited

U.S. PATENT DOCUMENTS

| | | | | |
|---|---|---|---|---|
| 8,677,315 | B1 * | 3/2014 | Anderson | G06F 8/60 |
| | | | | 717/101 |
| 9,135,146 | B1 * | 9/2015 | Allen | G06F 11/366 |
| 9,244,818 | B1 * | 1/2016 | Paleja | G06F 21/50 |
| 9,430,359 | B1 * | 8/2016 | Troutman | G06F 11/366 |
| 9,448,769 | B1 * | 9/2016 | Katoch | G06F 8/30 |
| 9,449,042 | B1 * | 9/2016 | Evans | G06F 8/36 |
| 2006/0143594 | A1 * | 6/2006 | Grimaldi | G06F 8/73 |
| | | | | 717/123 |
| 2007/0006041 | A1 * | 1/2007 | Brunswig | G06F 11/3688 |
| | | | | 714/38.14 |
| 2007/0083933 | A1 * | 4/2007 | Venkatapathy | G06F 21/577 |
| | | | | 726/25 |

(Continued)

OTHER PUBLICATIONS

Hock-Chuan, Chua, "Java Unit Testing with Junit and TestNG," Oct. 2013, last retrieved from https://www3.ntu.edu.sg/home/ehchua/programming/java/JavaUnitTesting.html on May 12, 2017.*
Web article: "8.3 Customizing Git—Git Hooks" published by GitHub 2015 [online][retrieved on: Aug. 21, 2015] retrieved from: https://git-scm.com/book/en/v2/Customizing-Git-Git-Hooks, 7 pps.
Web article: "CheckStyle" published 2015, [online][retrieved on: Aug. 21, 2015] retrieved from: http://checkstyle.sourceforge.net, 3 pps.

(Continued)

*Primary Examiner* — Andrew M. Lyons
(74) *Attorney, Agent, or Firm* — Lowenstein Sandler LLP

(57) ABSTRACT

Technologies are disclosed herein for generating comments in a source code review tool using code analysis tools. A producer module can be executed in order to obtain source code from a source code review tool. One or more source code analysis modules can then be executed in order to analyze the source code. A reporter module can then store the output of the source code analysis modules as comments in the source code review tool for use by a developer of the source code. The producer, reporter, and source code analysis modules can be executed in response to a request from the source code developer to perform a source code review, by a job scheduler, or in another manner. An application programming interface (API) exposed by the source code review tool can be utilized to obtain the source code and to store the comments associated with the source code.

17 Claims, 7 Drawing Sheets

(56) References Cited

U.S. PATENT DOCUMENTS

| | | | | |
|---|---|---|---|---|
| 2008/0295085 | A1* | 11/2008 | Rachamadugu | G06F 8/75 717/159 |
| 2010/0242028 | A1* | 9/2010 | Weigert | G06F 21/105 717/131 |
| 2011/0289481 | A1* | 11/2011 | Franklin | G06F 11/3668 717/125 |
| 2011/0321007 | A1* | 12/2011 | Marum | G06F 8/65 717/113 |
| 2013/0042221 | A1* | 2/2013 | Mehalingam | G06F 8/433 717/123 |
| 2014/0040863 | A1* | 2/2014 | Hale | G06F 8/36 717/123 |
| 2014/0123110 | A1* | 5/2014 | Wan | G06F 11/3672 717/124 |
| 2014/0196010 | A1* | 7/2014 | Balachandran | G06F 8/71 717/124 |
| 2014/0282403 | A1* | 9/2014 | Frenkiel | G06F 8/73 717/123 |
| 2015/0082277 | A1* | 3/2015 | Champlin-Scharff | G06F 9/454 717/120 |
| 2016/0070637 | A1* | 3/2016 | Furtwangler | G06F 11/3612 717/126 |
| 2016/0162387 | A1* | 6/2016 | Arguelles | G06F 11/3676 717/125 |
| 2016/0246699 | A1* | 8/2016 | Edri | G06F 8/68 |
| 2016/0292066 | A1* | 10/2016 | Stevens | G06F 11/3624 |
| 2017/0262265 | A1* | 9/2017 | Kellicker | G06F 8/51 |

OTHER PUBLICATIONS

Web article: "Cobertura", published 2015 [online][retrieved on Aug. 21, 2015] retrieved from: http://cobertura.github.io/cobertura/, 2 pps.

Web article: FindBugs—Find Bugs in Java Programs published by Sourceforge.net, Mar. 6, 2015 [online][retrieved on: Aug. 21, 2015] retrieved from: http://findbugs.sourceforge.net, 5 pps.

Web article: "Fortify Static Code Analyzer" published by Hewlett Packard 2015, copyright Hewlett Packard 2015 [online][retrieved on: Aug. 21, 2015] retrieved from:, http://www8.hp.com/us/en/software-solutions/static-code-analysis-sast/index.html, 4 pps.

Web article: "JaCoCo Java Code Coverage Library" published 2015, copyright 2006, 2015 Mountainminds GmbH & Co. [online][retrieved on: Aug. 21, 2015] retrieved from: http://www.eclemma.org/jacoco/, 2 pps.

Web article: "JUnit" published by Wikipedia 2015 [online][retrieved on: Aug. 21, 2015] retrieved from: https://en.wikipedia.org/wiki/JUnit, 3 pps.

Makarov, N. "5 Agile Development Practices We Found Most Useful", published Aug. 14, 2013 by Azoft, copyright 2015 Azoft [online][retrieved on Aug. 21, 2015] retrieved from: blog.azoft.com/agile-software-development-practices/ 4 pps.

Web article: "Review Board" published by Beanbag, copyright 2006-2015 Beanbag, Inc. [online][retrieved on: Aug. 21, 2015] retrieved from: https://www.reviewboard.org, 5 pps.

Web article: "TestNG" published by Wikipedia 2015 [online][retrieved on: Aug. 21, 2015] retrieved from: https://en.wikipedia.org/wiki/TestNG, 4 pps.

* cited by examiner

GENERATING SOURCE CODE REVIEW COMMENTS USING CODE ANALYSIS TOOLS

BACKGROUND

Source code review is a process by which a software developer sends proposed changes to source code to a source code review tool. Other software developers can utilize the source code review tool to review the changes to the source code and add text comments that include their feedback on the proposed changes to the source code. For example, a source code review tool might provide a graphical user interface ("GUI") through which developers can review proposed changes to source code and submit line-by-line comments on the proposed changes.

The developer of the source code can utilize the source code review tool to view the comments provided by the reviewing developers. The source code developer can then utilize the comments to modify the source code. For example, the source code developer might utilize the comments to fix identified problems in the source code. This process can be repeated any number of times until the source code developer is satisfied with the quality of the source code. At that time, the source code may be checked into a source code repository, deployed, or utilized in another manner.

The source code review process described above can be an effective method for identifying mistakes and other issues with source code. This process is, however, highly dependent upon the quality of the review performed by the reviewing developers. Because the source code review process involves manual interaction with the source code, this process can be error prone. For example, human source code reviewers sometimes miss very obvious errors in source code. In other cases, source code reviewers may waste time reviewing and commenting on source code that contains very obvious mistakes, such as the lack of any tests corresponding to the changed source code. This can be inefficient and frustrating for the software developers that perform the source code review and potentially embarrassing for the source code developer.

The disclosure made herein is presented with respect to these and other considerations.

DETAILED DESCRIPTION

Figure 1:
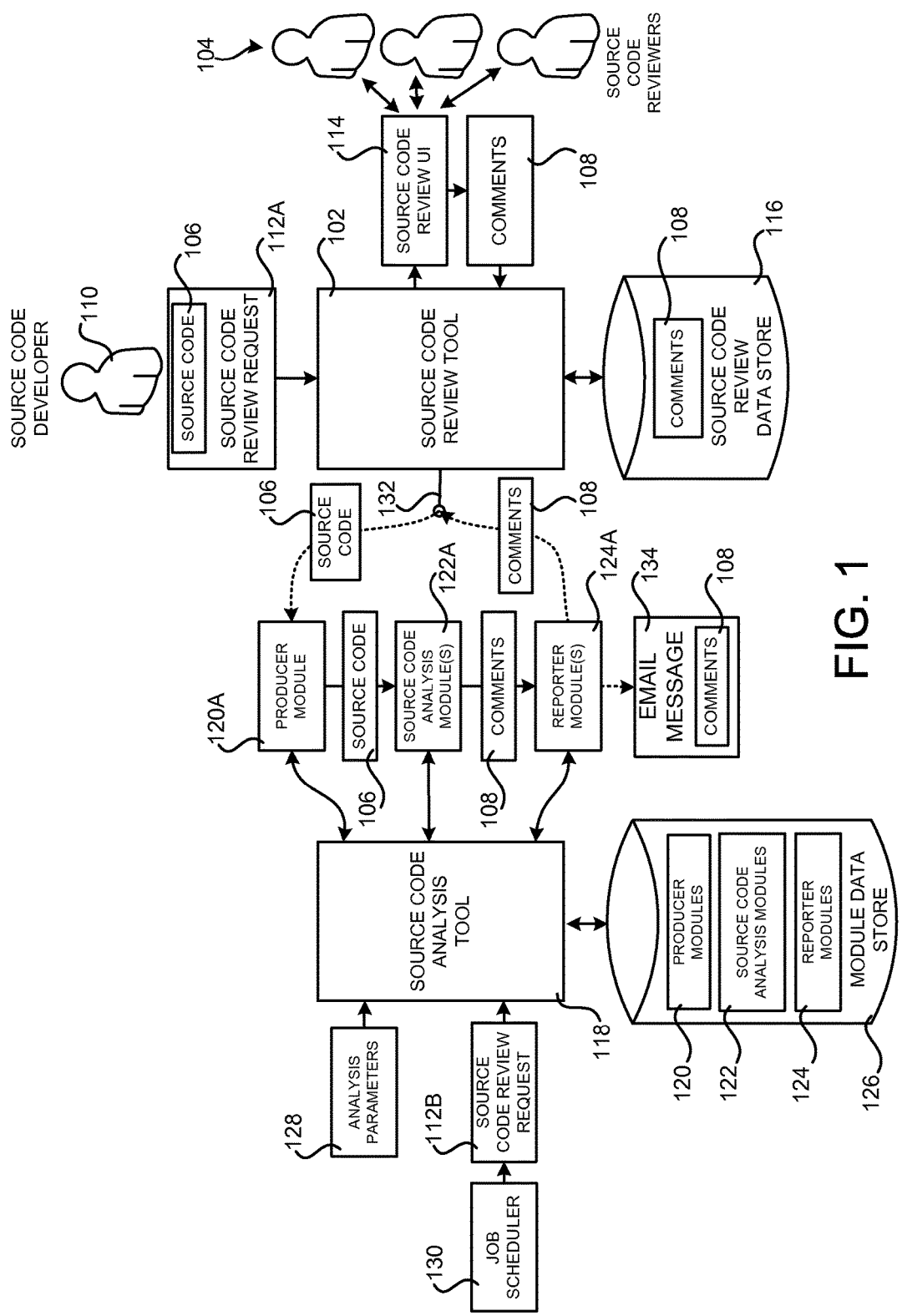
FIG. 1 is a software architecture diagram showing aspects of the configuration and operation of several components described herein for generating comments in a source code review tool using code analysis tools.

The following detailed description is directed to technologies for generating comments in a source code review tool using code analysis tools. Utilizing an implementation of the technologies described herein, a workflow can be triggered when a software developer requests a source code review that includes the execution of one or more developer-specified source code analysis modules. The source code analysis modules can provide functionality for performing static analysis on the source code, identifying security or privacy issues with the source code, determining adherence of the source code to various coding standards, determining code coverage of tests associated with the source code, performing unit or integration tests, determining if tests are present for the source code, and/or other types of functionality. The output of the source code analysis modules can then be added as comments that are associated with particular lines of the source code in a source code review tool.

By executing the source code analysis modules in the manner described herein, automatic and systematic discovery of issues in source code can be performed. This can remove the element of human error from the source code review process. Additionally, by performing the process described herein prior to initiating source code review by human reviewers, the reviewing software developers can be freed from focusing on easy-to-find issues and instead focus on locating more complex issues in the source code. Moreover, by providing the output of source code analysis modules as comments associated with lines in the source code in a source code review tool, the information contained in the output can be presented prominently such that the information cannot be missed by the source code developer. The technologies disclosed herein might also provide other technical benefits not specifically mentioned herein.

As mentioned briefly above, the technologies disclosed herein operate in conjunction with a source code review tool. The source code review tool permits a software developer to send proposed changes to source code for review by other software developers. The reviewing software developers can utilize the source code review tool to review the changes to the source code and add text comments that include their feedback on the proposed changes to particular lines in the source code. For example, the source code review tool can provide a GUI through which developers can review proposed changes to source code and submit line-by-line comments on the proposed changes.

The developer of the source code can then utilize the source code review tool to view the comments provided by the reviewing developers. The source code developer can also utilize the comments to modify the source code. For example, the source code developer might utilize the comments to address bugs or stylistic issues within the source code. This process can be repeated any number of times until the source code developer is satisfied with the quality of the source code. At that time, the source code may be checked into a source code repository, deployed, or utilized in another manner.

In one configuration disclosed herein, a source code analysis tool operates in conjunction with a source code review tool such as that described above in order to automatically execute source code analysis modules that analyze source code. The output of the source code analysis modules is then stored in the source code review tool as comments associated with particular lines in the source code. The comments can then be viewed and utilized in the same manner as comments generated by human source code reviewers.

In order to enable this functionality, a source code developer can specify analysis parameters that specify aspects of the manner in which the various modules are to be executed and, potentially, the source code that is to be analyzed. For example, and without limitation, the analysis parameters might specify one or more producer modules, one or more source code analysis modules, and one or more reporter modules. The producer modules provide functionality for obtaining the source code to be analyzed from the source code review tool. For example, and without limitation, the producer modules can utilize an application programming interface ("API") exposed by the source code review tool to obtain the source code to be analyzed.

The source code analysis modules provide functionality for analyzing the source code. For example, and as mentioned briefly above, the source code analysis modules can provide functionality for performing static analysis on the source code, identifying security or privacy issues with the source code, determining adherence of the source code to various coding standards, determining code coverage for tests associated with the source code, performing unit, integration, or other types of tests, determining if tests are present for the source code, and/or other types of functionality. In some configurations, the source code analysis modules can also generate a block flag that indicates that a manual source code review is not to be performed on the source code until the block flag is cleared. Using the block flag, serious issues with source code can be flagged and addressed by the source code developer prior to submitting source code for review by human reviewers.

The reporter modules provide functionality for reporting the output of the source code analysis modules. For example, and without limitation, a reporter module might utilize the API exposed by the source code review tool to store the output of the source code analysis modules as comments that are associated with the source in the source code review tool. The comments can specify the source code file, a line number in the source code, and text describing the output of the source code analysis module. Reporter modules can also be provided that provide the output of the source code analysis modules as email messages or other types of notifications.

In some configurations, the process described above is initiated when a source code developer requests a source code review. In other configurations, a job scheduler is utilized to periodically initiate the process described above. For example, the job scheduler might periodically (e.g. once every half hour) initiate the process described above for code reviews pending for a software developer or a team of software developers. The analysis parameters described above can be utilized to specify the particular source code reviews for which analysis is to be triggered by the job scheduler. Other types of mechanisms and stimuli might also be utilized to trigger the workflow described briefly above and in more detail below. Additional details regarding the various components and processes described briefly above for generating comments in a source code review tool using code analysis tools will be presented below with regard to FIGS. 1-7.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software architecture diagram showing aspects of the configuration and operation of several components described herein for generating comments in a source code review tool using code analysis tools. As shown in FIG. 1, and described briefly above, the technologies disclosed herein operate in conjunction with a source code review tool 102. The source code review tool 102 provides functionality for allowing a software developer, such as the source code developer 110, to send proposed changes to source code 106 for review by other software developers, such as the source code reviewers 104. The source code reviewers 104 can utilize functionality provided by the source code review tool 102 to review the source code 106 and add text comments 108 that include their feedback on the proposed changes to particular lines in the source code 106.

For example, the source code review tool 102 can provide an appropriate interface through which the source code developer 110 can submit a source code review request 112A with the source code 106 to be reviewed. The source code review request 112A might also specify the source code reviewers 104 that are to review the identified source code 106. The source code review tool 102 can also provide a suitable GUI, such as the source code review UI 114, through which the source code reviewers 104 can review the source code 106 and submit line-by-line comments 108 on the source code 106. The comments 108 supplied by the source code reviewers 104 can be stored in an appropriate data store, such as the source code review data store 116 shown in FIG. 1.

The source code review tool 102 can also provide a suitable UI through which the source code developer 110 can view the comments 108 provided by source code reviewers 104. The source code developer 110 can then utilize the comments 108 to modify the source code 106. For example, the source code developer 110 might utilize the comments 108 to address bugs or stylistic issues within the source code 106. This process can be repeated any number of times until the source code developer 110 is satisfied with the quality of the source code 106. At that time, the source code 106 may be checked into a source code repository (not shown in FIG. 1), deployed, or utilized in another manner.

As discussed briefly above, the source code review process described above can be an effective method for identifying mistakes and other issues with source code 106. This process is, however, highly dependent upon the quality of the review performed by the source code reviewers 104. Because the source code review process involves manual interaction with the source code 106, this process can be error prone. For example, human source code reviewers 104 can miss very obvious errors in source code 106. In other cases, source code reviewers 104 may waste time reviewing and commenting on source code 106 that contains very obvious mistakes, such as the lack of any tests corresponding to the changed source code 106. This can be inefficient and frustrating for the source code reviewers 104 and potentially embarrassing for the source code developer 110.

In order to address these considerations, and potentially others, a source code analysis tool 118 is provided that operates in conjunction with the source code review tool 102 in one particular configuration. As will be described in greater detail below, the source code analysis tool 118 is a software component that is configured to automatically execute source code analysis modules 122 that analyze source code 106. The output of the source code analysis modules 122 is then stored by the source code review tool 102 as comments 108 that are associated with particular lines in the analyzed source code 106. The comments 108 generated by the source code analysis modules 122 can then be viewed and utilized by a source code developer 110 in the same manner as comments 108 generated by human source code reviewers 104.

In order to enable this functionality, a source code developer 110 can specify analysis parameters 128 that define the manner in which various modules are to be executed and identify the source code 106 that is to be analyzed. For example, and without limitation, the analysis parameters 128 might specify one or more producer modules 120, one or more source code analysis modules 122, and one or more reporter modules 124. As shown in FIG. 1, the producer modules 120, the source code analysis modules 122, and the reporter modules 124 can be stored in a suitable local or networked data store that is accessible to the source code analysis tool 118, such as the module data store 126.

As will be described in greater detail herein, the producer modules 120 are software components that provide functionality for obtaining the source code 106 to be analyzed from the source code review tool 102. For example, and without limitation, the producer modules 120 can utilize an API 132 exposed by the source code review tool 102 to obtain the source code 106 to be analyzed. The API 132 might be a network services API or another type of API in other configurations.

The source code analysis modules 122 are software components that provide functionality for analyzing the source code 106. For example, and as mentioned briefly above, the source code analysis modules 122 can provide functionality for performing static analysis on the source code 106, identifying security or privacy issues with the source code 106, determining adherence of the source code 106 to various coding standards, determine code coverage for tests associated with the source code 106, perform unit, integration, or other types of tests of the source code 106, determine if tests are present for the source code 106, and/or other types of functionality.

In some configurations, the source code analysis modules 122 can also generate a block flag (not shown in FIG. 1) that indicates that a manual source code review (i.e. a review of the source code by the source code reviewers 104) is not to be performed on the source code 106 until the block flag is cleared. Using the block flag, serious issues with the source code 106 can be flagged and addressed by the source code developer 110 prior to submitting the source code 106 for review by the human source code reviewers 104. Additional details regarding the operation of the source code analysis modules 122 will be provided below with regard to FIGS. 2 and 3.

The reporter modules 124 are software components that provide functionality for reporting the output of the source code analysis modules 122. For example, and without limitation, a reporter module 124 might utilize the API 132 exposed by the source code review tool 102 to store the output of the source code analysis modules 122 as comments 108 that are associated with lines in the source code 108 by the source code review tool 102. The comments 108 can specify the file containing the source code 106, a line number in the source code 106, and text describing the output of the source code analysis module 122. Reporter modules 124 can also be provided that provide the output of the source code analysis modules 122 as an email message 134 or another type of notification. It should be appreciated that the reporter modules 124 will not be executed if there are no comments 108 generated by the source code analysis modules 122.

In the example shown in FIG. 1, for instance, a producer module 120A has been executed in order to obtain source code 106 from the API 132 exposed by the source code review tool 102 for analysis. The obtained source code 106 has been passed to one or more source code analysis modules 122. The output of the source code analysis modules 122 has been provided as comments 108 to the reporter modules 124A. In turn, the reporter modules 124A have submitted the comments 108 generated by the source code analysis modules 122A to the source code review tool 102 via the API 132. The reporter modules 124A have also generated an email message 134 containing the comments 108. The email message 134 can be transmitted to the source code developer 110, for example. As mentioned above, multiple reporter modules 124 can be executed in order to provide other types of notifications and reporting functionality.

In some configurations, the process described above is initiated when the source code developer 110 requests a source code review from the source code review tool 102. In other configurations, a job scheduler 130 (e.g. the UNIX software utility CRON) is utilized to periodically initiate the automated code review process described above. For example, the job scheduler 130 might periodically (e.g. once every half hour or other time period) submit a source code review request 112B to initiate the process described above for code reviews pending in the source code review tool 102 for a particular software developer (e.g. the source code developer 110) or a team of software developers. The analysis parameters 128 described above can be utilized to specify the particular source code reviews for which automated analysis is to be triggered by the job scheduler 130.

Other types of mechanisms and stimuli might also be utilized to trigger the workflow described briefly above and in more detail below. In this regard, it should be appreciated that the functionality described herein might be implemented in other ways than that shown in FIG. 1. For example, and without limitation, the functionality described above can be implemented directly within the source code review tool 102 so that automated reviews can be performed when a source code developer 110 submits a source code review request 112A. In this case, the automated review process can be performed one or more times prior to initiating a review by the human source code reviewers 104.

In another configuration, the disclosed functionality is implemented within or in conjunction with a source code repository (not shown in FIG. 1). In this configuration, the automated source code review process disclosed herein can be initiated in response to a request to check source code 106 into the repository. The automated review process can be performed prior to actually checking the source code 106 into the repository. It should be appreciated that these configurations are merely illustrative and that other configurations can be utilized. Additional details regarding the various mechanisms disclosed herein for generating source code review comments using code analysis tools will be provided below with regard to FIGS. 2-4.

Figure 2:
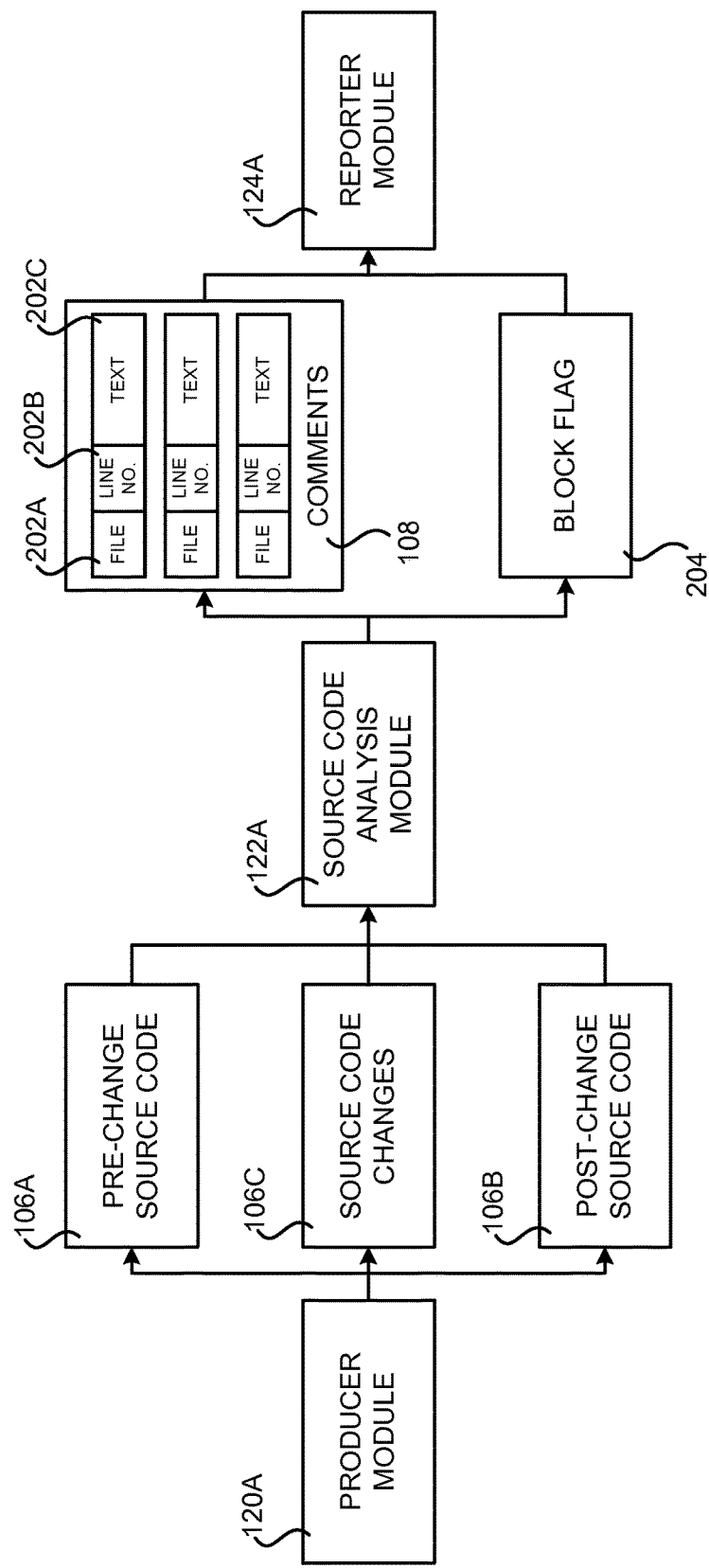
FIG. 2 is a software architecture diagram showing additional aspects of the configuration and operation of the components shown in FIG. 1 for generating comments in a source code review tool using code analysis tools.

FIG. 2 is a software architecture diagram showing additional aspects of the configuration and operation of several of the components shown in FIG. 1 for generating comments 108 in a source code review tool 102 using code analysis tools, such as the source code analysis modules 122. As discussed briefly above, the producer modules 120 are configured to obtain source code 106 to be analyzed and to provide the source code 106 to the source code analysis modules 122 for analysis. For example, and without limitation, a particular producer module 120A can be configured to obtain pre-change source code 106A, post-change source code 106B, and source code changes 106C using the API 132 exposed by the source code review tool 102. The producer modules 120 might also obtain source code 106 from other locations utilizing other mechanisms in other configurations.

In one configuration, the source code analysis modules 122 analyze only the source code changes 106C. In this way, comments are generated only for changed portions of source code rather than for the entire source code. In other configurations, the source code analysis modules 122 may operate on both source code changes 106C and non-changed source code. In this configuration, a developer can obtain comments 108 generated by the source code analysis modules 122 even for lines of source code that have not changed.

As discussed briefly above, the source code analysis modules 122, such as the source code analysis module 122A shown in FIG. 2, are configured to analyzed the source code 106 in various ways and to generate comments 108 that contain their output. As shown in FIG. 2, the comments 108 can include a number of lines that include a field 202A identifying the file containing the source code 106, a field 202B specifying the line number in the source code 106 to which a comment applies, and a field 202C containing the text of the comment itself. In this regard, it should be appreciated that the fields 202A-202C are merely illustrative and that other data output by the source code analysis modules 122 can be included in the comments 108.

As shown in FIG. 2, the source code analysis module 122A provides the output comments 108 to the reporter module 124A. The reporter module 124A in turn provides the comments 108 to the source code review tool 102. The reporter module 124A might alternately provide the comments 108 in an email message 134 to the source code developer 110 or in another type of notification. The reporter modules 124 might also output the comments 108 generated by the source code analysis modules 122 to other systems in other ways not specifically mentioned herein.

As shown in FIG. 2 and discussed briefly above, a source code analysis module 122A might also provide a block flag 204 to the reporter module 124A. As discussed above, the presence of the block flag 204 indicates to the source code review tool 102 that a manual source code review (i.e. a source code review performed by the source code reviewers 104) is not to be performed on the source code 106 until the block flag 204 is cleared. The block flag 204 can be cleared by revising the source code to remove any issues identified by the source code analysis module 122 and executing the source code analysis module 122A a second time. The block flag 204 might also be manually overridden by the source code developer 110. Using the block flag 204 in this manner, serious issues with the source code 106 can be flagged and addressed by the source code developer 110 prior to submitting the source code 106 for review by the human source code reviewers 104.

Figure 3:
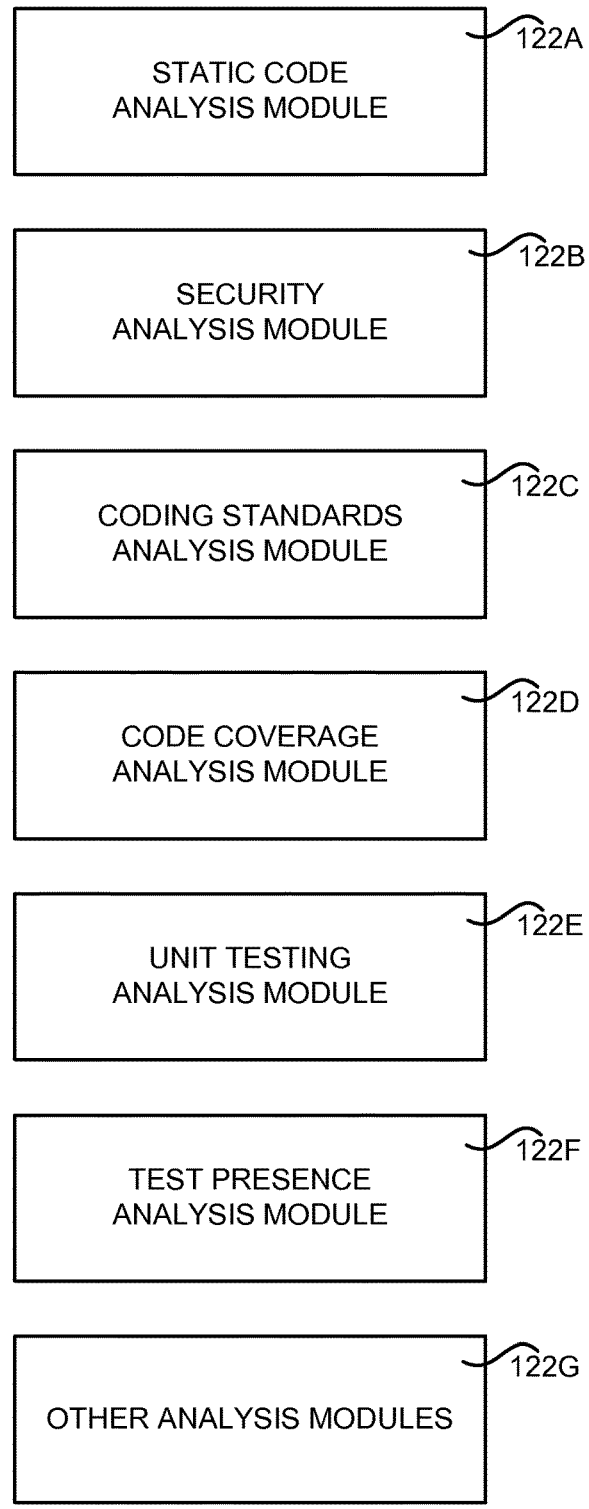
FIG. 3 is a software architecture diagram illustrating several types of code analysis modules that can be utilized to generate comments in a source code review tool in various configurations disclosed herein.

FIG. 3 is a software architecture diagram illustrating several types of code analysis modules 122 that can be utilized to generate comments 108 in the source code review tool 102 according to various configurations disclosed herein. For example, and without limitation, a static code analysis module 122A can be utilized in some configurations. The static code analysis module 122A performs static code analysis on the source code 106 in order to locate problems (commonly called "bugs") in the source code 106. In one specific implementation, the static code analysis module 122A is the FINDBUGS static code analysis tool. Other static code analysis tools might also be utilized in other configurations.

A security analysis module 122B can also be utilized in some configurations. The security analysis module 122B is configured to identify security issues in the source code 106. For example, and without limitation, the security analysis module 122B is the FORTIFY static code analyzer in one particular configuration. The FORTIFY static code analyzer is configured to search the source code 106 for violations of security-specific coding rules and guidelines in a variety of programming languages. Other types of security analysis tools might also be utilized in other configurations. Other modules might also identify violations of user privacy coding rules in other configurations.

A coding standards analysis module 122 can also be utilized. The coding standards analysis module 122 identifies violations of coding standards in the source code 106. In one specific implementation, the coding standards analysis module 122 is the CHECKSTYLE coding standard tool. Other coding standard tools can be utilized in other configurations.

The code coverage analysis module 122D executes unit tests (not shown in FIG. 2) on the source code 106 and calculates code coverage for the unit tests using tools such as TESTNG/JUNIT and COBERTURA/JACOCO. The code coverage analysis module 122D can then add a comment 108 indicating the coverage of the unit tests. For example, and without limitation, the code coverage analysis module 122D might add a comment 108 if a particular class has zero code coverage. In other configurations, the code coverage analysis module 122D can add comments 108 for each method in the source code 106 that is missing code coverage. In other configurations, the code coverage analysis module 122D can add comments 108 indicating that the code coverage for a portion of the source code 106 has dropped as compared to a previous version.

The unit testing analysis module 122E can run unit tests on the source code 106 and add comments 108 describing the execution of the unit tests, such as identifying failed tests. Execution of the unit testing analysis module 122E can prevent the possibility that the source code developer 110 fails to perform unit tests on the source code 106 prior to submission of the source code 106 to the source code review tool 102. Other types of tests other than unit tests, such as integration tests performed by an integration testing analysis module (not shown in FIG. 3), can also be performed in a similar manner.

The test presence analysis module 122F is configured to search for test files associated with the source code 106. For example, and without limitation, the test presence analysis module 122F might search a particular local or network file location for tests associated with the source code 106. A comment 108 can be generated if no tests are found for the source code 106. Alternately, the test presence analysis module 122F can look for changes to or comments within files containing tests. If no changes are located, this might indicated that no tests were added for modified source code. A comment 108 that is associated 106 with lines in the source code 106 might also be generated in this scenario. Other mechanisms might also be utilized to determine whether tests exist or have been updated for source code 106.

It should be appreciated that the various analysis modules 122A-122F described above are merely illustrative. Other analysis modules 122G can also be utilized in other configurations. Additionally, a source code developer 110 or a team of source code developers can select combinations of the analysis modules 122 for execution. In this way, the workflow described above can be customized for the particular needs of a single source code developer 110 or a team of software developers.

Figure 4:
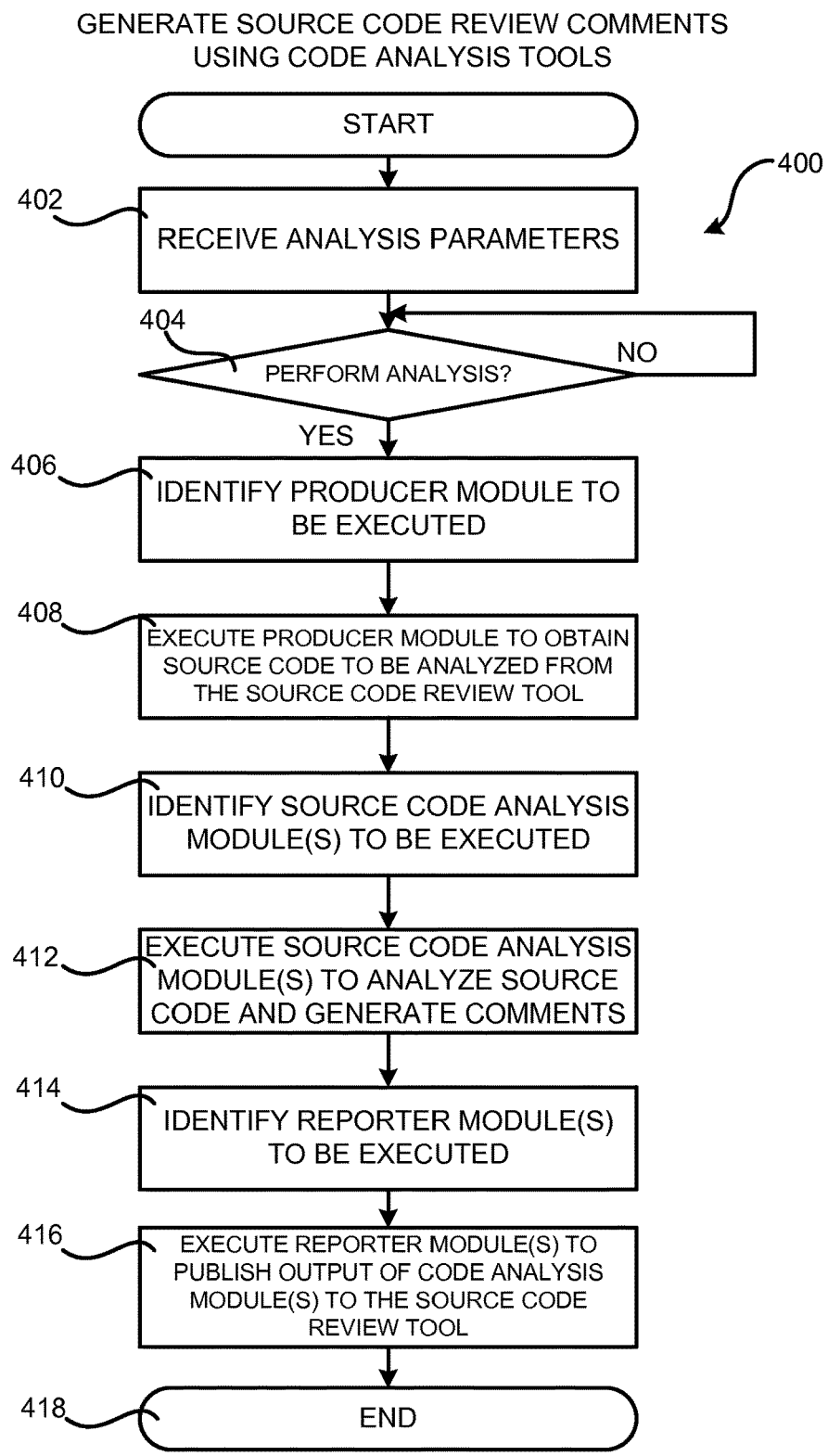
FIG. 4 is a flow diagram illustrating aspects of a routine disclosed herein for generating comments in a source code review tool using code analysis tools.

FIG. 4 is a flow diagram illustrating aspects of a routine 400 disclosed herein for generating comments 108 in a source code review tool 102 using code analysis tools, such as the source code analysis modules 122. It should be appreciated that the logical operations described herein with respect to FIG. 4, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations might also be performed by components other than those specifically identified.

The routine 400 begins at operation 402, where the source code analysis tool 118 receives the analysis parameters 128. As discussed above, the source code developer 110 can specify analysis parameters 128 that specify the source code 106 to be analyzed, the producer modules 120, source code analysis modules 122 and reporter modules 124 to be executed, and/or other parameters defining the manner in which the source code 106 is to be analyzed.

From operation 402, the routine 400 proceeds to operation 404, where the source code analysis tool 118 determines if an automated analysis of source code 106 is to be performed. As discussed above, a job scheduler 130 or the source code developer 110 can trigger the workflow. In other configurations, submitting a source code review request 112A to the source code review tool 102 or submitting source code 106 to a code repository can also trigger the workflow. Other types of stimuli might also trigger the workflow described herein.

If source code 106 is to be analyzed, the routine 400 proceeds to operation 406. At operation 406, the producer module 120, or modules, to be executed are identified. In one configuration, the analysis parameters 128 specify the producer modules 122 that are to be executed. Other mechanisms can be utilized in other configurations.

From operation 406, the routine 400 proceeds to operation 408 where the identified producer modules 120 are executed. As discussed above, the producer modules 120 can obtain the source code 106 to be analyzed from the source code review tool 102. The producer modules 120 might also be configured to obtain the source code 106 to be analyzed from a source code repository or another location in other configurations.

From operation 408, the routine 400 proceeds to operation 410, where the source code analysis module 122, or modules, to be executed are identified. As with the producer modules 120, the source code analysis modules 122 to be executed can be identified by the analysis parameters 128. Other mechanisms can also be utilized to identify the source code analysis modules 122 that are to be executed.

From operation 410, the routine 400 proceeds to operation 412, where the source code analysis modules 122 identified at operation 410 are executed. As discussed above, the source code analysis modules 122 can provide functionality for performing static analysis on the source code 106, identifying security or privacy issues with the source code 106, determining adherence of the source code 106 to various coding standards, determining code coverage of tests associated with the source code 106, performing unit or integration tests, determining if tests are present for the source code 106, and/or other types of functionality. The source code analysis modules 122 can provide their output in the form of comments 108 that are associated with particular line numbers in the source code 106.

From operation 412, the routine 400 proceeds to operation 414, where the reporter module 124, or modules, to be executed are identified. As with the producer modules 120 and the source code analysis modules 122, the reporter module 124 to be executed can be identified by the analysis parameters 128. Other mechanisms can also be utilized to identify the reporter modules 124 that are to be executed.

From operation 414, the routine 400 proceeds to operation 416, where the reporter modules 124 are executed. As discussed above, the reporter modules 124 can be configured to publish the comments 108 output by the source code analysis modules 122 for storage by the source code review tool 102 via the API 132 or another mechanism. The reporter modules 124 can also provide the comments 108 in an email message 134 or another type of notification. The source code developer 110 can then utilize the supplied comments 108 in order to modify the source code 106. The process described above might then be repeated on the modified source code 106. From operation 416, the routine 400 proceeds to operation 418, where it ends.

In the configurations described above, the producer module 120, the source code analysis modules 122, and the reporter modules 124 to be executed are identified based upon the analysis parameters 128. In this regard, it should be appreciated that the producer module 120, the source code analysis modules 122, and the reporter modules 124 to be executed can be identified in other ways in other configurations. For example, and without limitation, the producer module 120, the source code analysis modules 122, and the reporter modules 124 to be executed can be selected in an automated fashion based upon the type of source code review tool 102, the type or content of the source code 106, or based upon other attributes. As another example, the source code analysis modules 122 to be executed might be selected based upon whether certain tests have been modified. For instance, if unit tests have been modified, then the unit testing analysis module might be selected for execution.

In yet another configuration, one or more source code analysis modules 122 might be preemptively executed (i.e. without being specified by the source code developer 110). If relevant comments 108 are generated by the execution of the source code analysis modules 122, then a suggestion might be provided to the source code developer 110 through email or another type of notification that the developer should add the source code analysis modules 122 to the analysis parameters 128. If no comments 108 are generated, then the preemptive execution of the source code analysis modules 122 would be transparent to the source code developer 110. Other mechanisms not specifically mentioned herein can also be utilized to select the producer module 120, the source code analysis modules 122, and the reporter modules 124 to be executed in an automated manner.

Figure 5:
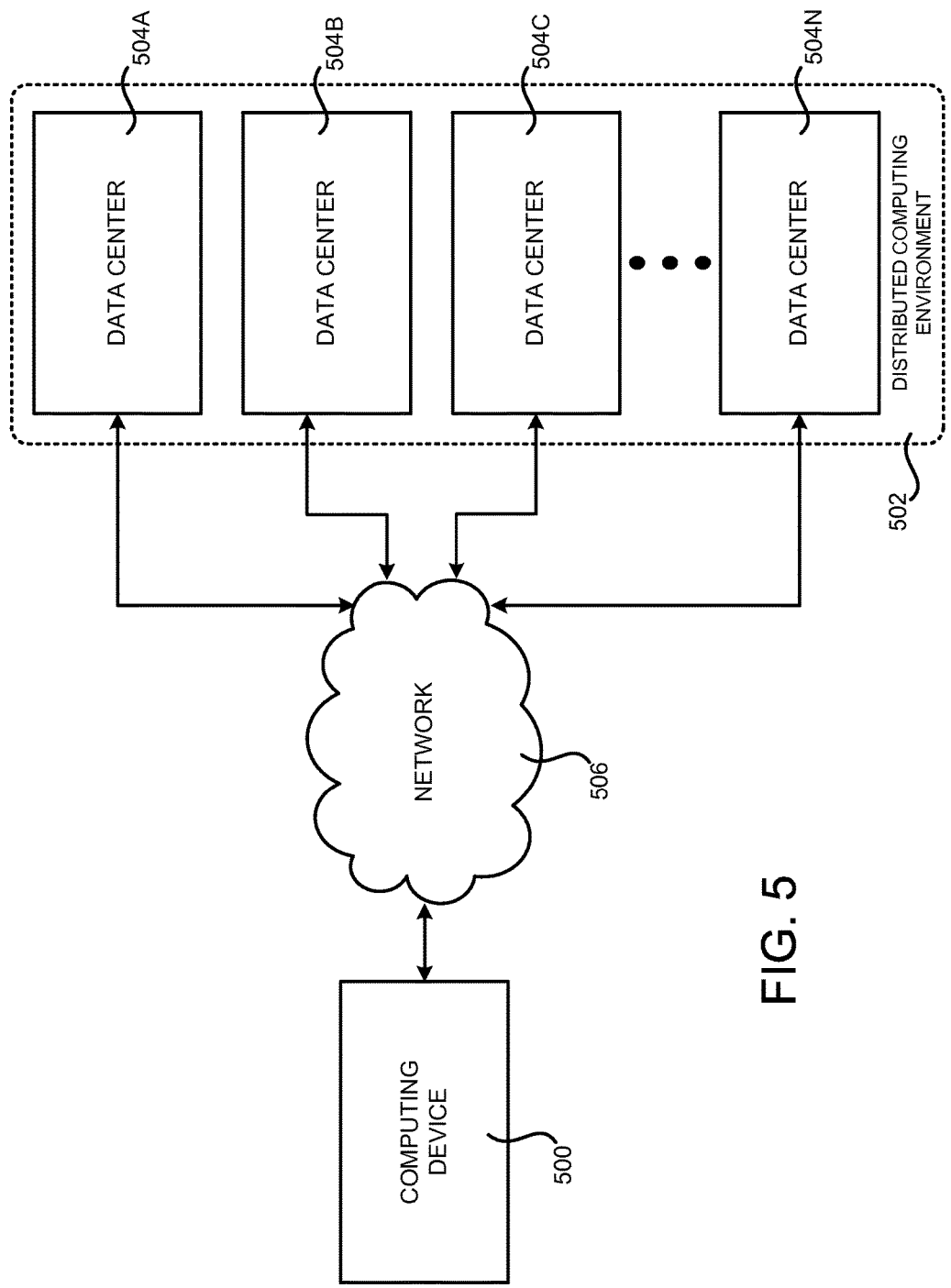
FIG. 5 is a system and network diagram that shows aspects of an illustrative operating environment for implementing aspects of the functionality described herein.

FIG. 5 is a system and network diagram that shows one illustrative operating environment for the technologies disclosed herein for generating comments 108 in a source code review tool 102 using code analysis tools. The distributed computing environment 502 shown in FIG. 5 can be configured to provide various types of computing resources that can be configured and operated in order to provide the functionality disclosed herein.

The computing resources implemented and utilized by the distributed computing environment 502 can include various types of computing resources, such as data processing resources, data storage resources, networking resources, data communication resources, network services, and the like. Data processing resources can include physical computers or virtual machine instances in a number of different configurations. The virtual machine instances can be configured to execute applications, including web servers, application servers, media servers, database servers, some or all of the services described above, and/or other types of programs. Data storage resources can include file storage devices, block storage devices, and the like. The distributed computing environment 502 might also be configured to provide and utilize other types of resources and/or network services in order to implement the functionality disclosed herein.

The computing resources described above are provided in one implementation by one or more data centers 504A-504N (which might be referred herein singularly as "a data center 504" or in the plural as "the data centers 504"). The data centers 504 are facilities utilized to house and operate computer systems and associated components. The data centers 504 typically include redundant and backup power, communications, cooling, and security systems. The data centers 504 might also be located in geographically disparate locations. One illustrative configuration for a data center 504 that implements some of the technologies disclosed herein for generating comments 108 in a source code review tool 102 using code analysis tools will be described below with regard to FIG. 6.

The users of the distributed computing environment 502 can access the functionality provided by the distributed computing environment 502 over a network 506, which can be a wide area communication network ("WAN"), such as the Internet, an intranet or an Internet service provider ("ISP") network or a combination of such networks. For example, and without limitation, a computing device 500 operated by a customer or other user of the distributed computing environment 502 might be utilized to access the distributed computing environment 502 by way of the network 506. It should be appreciated that a local-area network ("LAN"), the Internet, or any other networking topology known in the art that connects the data centers 504 to remote customers and other users can be utilized. It should also be appreciated that combinations of such networks might also be utilized.

Figure 6:
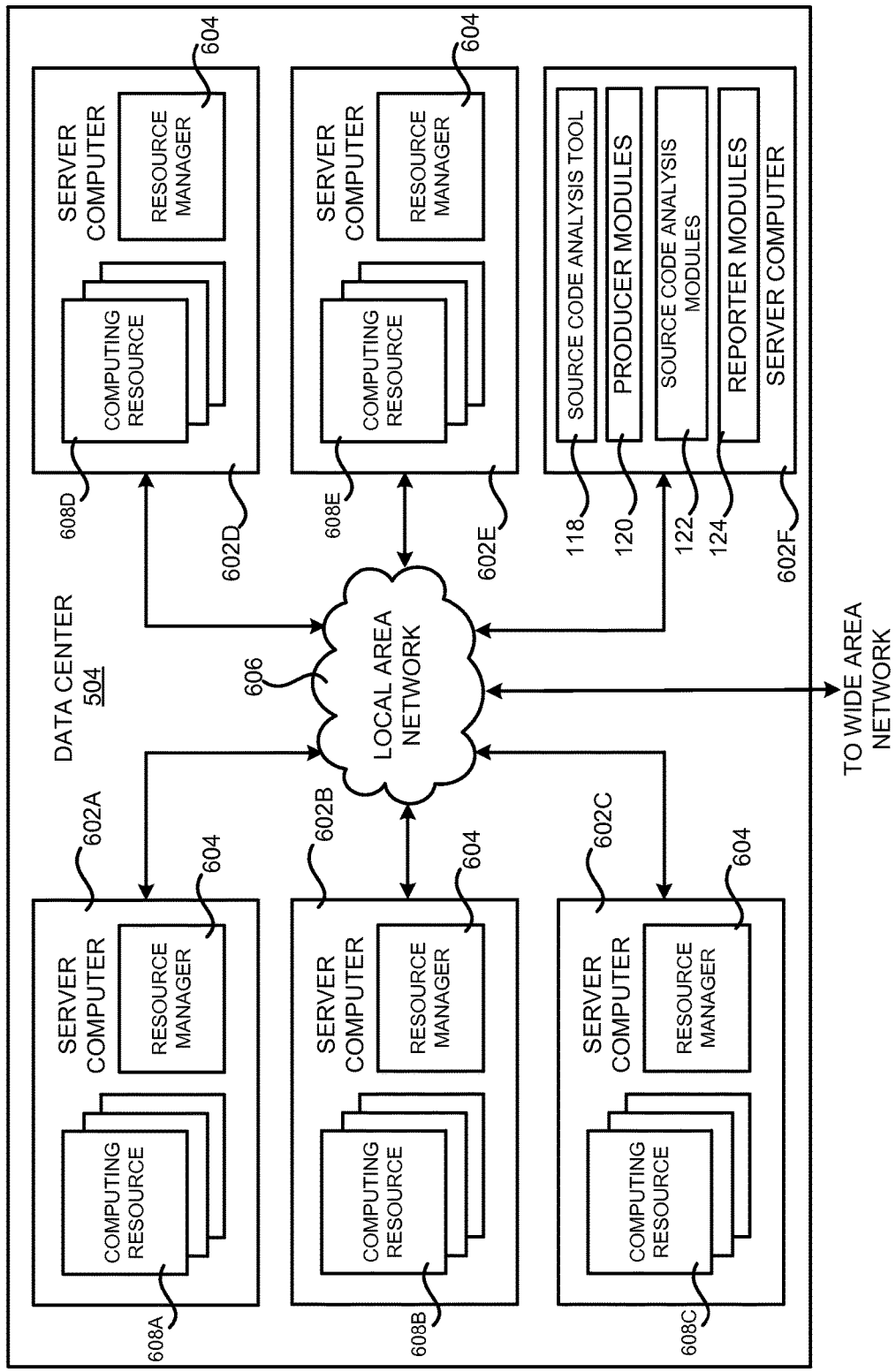
FIG. 6 is a computing system diagram that illustrates a configuration for a data center that can be utilized to implement aspects of the technologies disclosed herein.

FIG. 6 is a computing system diagram that illustrates one configuration for a data center 504 that implements aspects of the concepts and technologies disclosed herein for generating comments in a source code review tool using code analysis tools. The example data center 504 shown in FIG. 6 includes several server computers 602A-602F (which might be referred to herein singularly as "a server computer 602" or in the plural as "the server computers 602") for providing computing resources 608A-608E that implement the functionality disclosed herein.

The server computers 602 can be standard tower, rackmount, or blade server computers configured appropriately for providing computing resources configured to provide the functionality described above. As mentioned above, the computing resources might be data processing resources such as virtual machine instances or hardware computing systems, data storage resources, database resources, networking resources, and others. Some of the servers 602 might also be configured to execute a resource manager 604 capable of instantiating and/or managing the computing resources. In the case of virtual machine instances, for example, the resource manager 604 might be a hypervisor or another type of program configured to enable the execution of multiple virtual machine instances on a single server 602.

Figure 7:
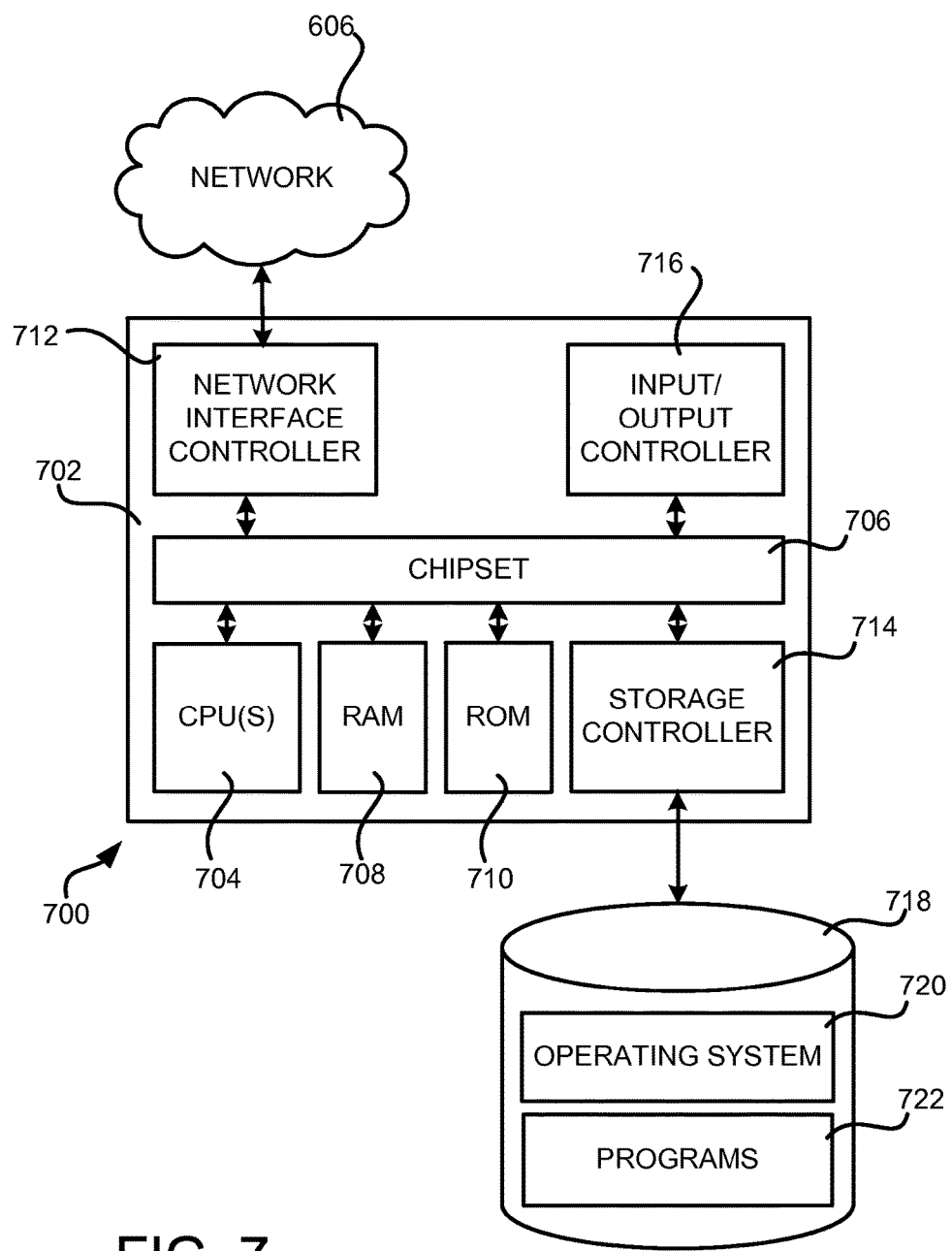
FIG. 7 is a computer architecture diagram showing an illustrative computer hardware architecture for implementing a computing device that might be utilized to implement aspects of the various technologies presented herein.

The data center 504 shown in FIG. 7 also includes a server computer 602F that can execute some or all of the software components described above. For example, and without limitation, the server computer 602F might be configured to execute the source code analysis tool 118, the producer modules 120, the source code analysis modules 122, the reporter modules 124, and/or other types of software components. The server computer 602F might also be configured to execute other components and/or to store data for providing some or all of the functionality described herein. In this regard, it should be appreciated that the program components illustrated in FIG. 6 as executing on the server computer 602F might execute on many other physical or virtual servers in the data centers 504 in various configurations.

In the example data center 504 shown in FIG. 6, an appropriate LAN 606 is also utilized to interconnect the server computers 602A-602F. The LAN 606 is also connected to the network 506 illustrated in FIG. 5. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components might also be utilized for balancing a load between each of the data centers 504A-504N, between each of the server computers 602A-602F in each data center 504, and, potentially, between computing resources in each of the data centers 504. It should be appreciated that the configuration of the data center 504 described with reference to FIG. 6 is merely illustrative and that other implementations can be utilized.

FIG. 7 shows an example computer architecture for a computer 700 capable of executing program components for implementing various aspects of the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. For example, the computer architecture shown in FIG. 7 can be utilized to execute some or all of the software components described above for generating source code review comments 108 in a source code review tool 102 using code analysis tools, such as the source code analysis modules 122.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include, but are not limited to, electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 606. The chipset 706 can include functionality for providing network connectivity through a NIC 712, such as a gigabit Ethernet adapter. The NIC 712 is capable of connecting the computer 700 to other computing devices over the network 606. It should be appreciated that multiple NICs 712 can be present in the computer 700, connecting the computer to other types of networks and remote computer systems.

The computer 700 can be connected to a mass storage device 718 that provides non-volatile storage for the computer. The mass storage device 718 can store an operating system 720, programs 722, and data, which have been described in greater detail herein. The mass storage device 718 can be connected to the computer 700 through a storage controller 714 connected to the chipset 706. The mass storage device 718 can include one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the mass storage device 718 by transforming the physical state of the physical storage units to reflect the information being stored. The specific transformation of physical state might depend on various factors, in different implementations of this description. Examples of such factors can include, but are not limited to, the technology used to implement the physical storage units, whether the mass storage device 718 is characterized as primary or secondary storage, and the like.

For example, the computer 700 can store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the mass storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 718 can store an operating system 720 utilized to control the operation of the computer 700. According to one configuration, the operating system comprises the LINUX operating system. According to another configuration, the operating system comprises the WINDOWS SERVER operating system from MICROSOFT Corporation. According to further configurations, the operating system comprises the UNIX operating system or one of its variants. It should be appreciated that other operating systems can also be utilized. The mass storage device 718 can store other system or application programs and data utilized by the computer 800.

In one configuration, the mass storage device 718 or other computer-readable storage media is encoded with computer-executable instructions which, when loaded into the computer 700, transform the computer from a general-purpose computing system into a special-purpose computer capable of implementing the configurations described herein. These computer-executable instructions transform the computer 700 by specifying how the CPUs 704 transition between states, as described above. According to one configuration, the computer 700 has access to computer-readable storage media storing computer-executable instructions which, when executed by the computer 700, perform the various processes described above with regard to FIGS. 1-4. The computer 700 might also include computer-readable storage media for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, a plotter, or other type of output device. It will be appreciated that the computer 700 might not include all of the components shown in FIG. 7, can include other components that are not explicitly shown in FIG. 7, or might utilize an architecture completely different than that shown in FIG. 7.

Based on the foregoing, it should be appreciated that technologies for generating comments in a source code review tool using code analysis tools have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. An apparatus comprising:
a processor; and
a non-transitory computer-readable storage medium having instructions stored thereon that, if executed by the processor, cause the processor to:
receive a request to perform a review of source code;
execute at least one producer module configured to obtain the source code from an application programming interface (API) exposed by a source code review tool;
execute at least one source code analysis module configured to:
generate a flag indicating that a manual source code review is not to be performed on the source code until the flag is cleared;
perform a review of the source code to determine one or more changes to the source code;
generate at least one comment describing the one or more changes to one or more particular lines of the source code;
associate the one or more changes and at least one comment with the flag;
confirm that the one or more changes comply with one or more analysis parameters; and
in response to confirming the one or more changes comply with the one or more analysis parameters, clear the flag;
utilize the API to publish the at least one comment generated by the source code analysis module at the source code review tool.

2. The apparatus of claim 1, wherein the non-transitory computer-readable storage medium has further instructions stored thereupon to:
receive analysis parameters identifying the at least one producer module, the at least one source code analysis module, and the at least one reporter module; and
responsive to the request to perform the review of the source code, utilize the analysis parameters to identify the at least one producer module, the at least one source code analysis module, and the at least one reporter module to execute.

3. The apparatus of claim 2, wherein the analysis parameters further identify the source code.

4. The apparatus of claim 1, wherein the request to perform the review of the source code is received from a job scheduler.

5. The apparatus of claim 1, wherein the at least one comment comprises an identifier for the source code, data identifying a line number in the source code, and text generated by the at least one source code analysis module.

6. A non-transitory computer-readable storage medium having computer-executable instructions stored thereon that, if executed by a processor, cause the processor to:
execute at least one producer module configured to obtain source code from a source code review tool;
execute at least one source code analysis module configured to:
generate a flag indicating that a manual source code review is not to be performed on the source code until the flag is cleared;
perform a review of the source code to determine one or more changes to the source code;

generate at least one comment describing the one or more changes to one or more particular lines of the source code;

associate the one or more changes and at least one comment with the flag; and confirm that the one or more changes comply with one or more analysis parameters; and in response to confirming the one or more changes comply with the one or more analysis parameters, clear the flag and enable at least one reporter module to cause the at least one comment and the one or more changes to be published by the source code review tool.

7. The non-transitory computer-readable storage medium of claim 6, wherein the at least one producer module is configured to utilize an application programming interface (API) exposed by the source code review tool to obtain the source code.

8. The non-transitory computer-readable storage medium of claim 6, wherein the at least one reporter module is configured to utilize an application programming interface (API) exposed by the source code review tool to store the at least one comment.

9. The non-transitory computer-readable storage medium of claim 6, wherein execution of the at least one producer module, the at least one source code analysis module, and the at least one reporter module is triggered by a submission of the source code for source code review.

10. The non-transitory computer-readable storage medium of claim 6, wherein execution of the at least one producer module, the at least one source code analysis module, and the at least one reporter module is initiated by a job scheduler.

11. The non-transitory computer-readable storage medium of claim 6, wherein the at least one source code analysis module comprises one or more of a static code analysis module, a security analysis module, a coding standards analysis module, a code coverage analysis module, a unit testing analysis module, an integration testing analysis module, or a test presence analysis module.

12. A computer-implemented method comprising:

executing a first module to obtain source code from a source code review tool;

executing a second module to:
generate a flag indicating that a manual source code review is not to be performed on the source code until the flag is cleared;

perform a review of the source code to determine one or more changes to the source code;

generate at least one comment describing the one or more changes to one or more particular lines of the source code;

associate the one or more changes and at least one comment with the flag;

confirm that the one or more changes comply with one or more analysis parameters; and in response to confirming the one or more changes comply with the one or more analysis parameters, clear the flag and enable at least one reporter module to cause the at least one comment and one or more changes to be published by the source code review tool.

13. The computer-implemented method of claim 12, wherein the first module comprises a producer module configured to utilize an application programming interface exposed by the source code review tool to obtain the source code.

14. The computer-implemented method of claim 12, wherein the second module comprises one or more of a static code analysis module, a security analysis module, a coding standards analysis module, a code coverage analysis module, a unit testing analysis module, an integration testing analysis module, or a test presence analysis module.

15. The computer-implemented method of claim 12, wherein a third module comprises a reporter module configured to utilize an application programming interface exposed by the source code review tool to store the at least one comment associated with the source code in the source code review tool.

16. The computer-implemented method of claim 12, wherein execution of the first module, the second module, and the third module is initiated in response to a submission of the source code for source code review.

17. The computer-implemented method of claim 12, wherein execution of the first module, the second module, and the third module is initiated by a job scheduler.

* * * * *